(12) United States Patent
Burling

(10) Patent No.: US 12,246,784 B2
(45) Date of Patent: Mar. 11, 2025

(54) DEVICE TO ENHANCE THE TRACTION OF A TRACKED VEHICLE

(71) Applicant: JB Innovations Limited, New Plymouth (NZ)

(72) Inventor: John Menzies Burling, Eltham (NZ)

(73) Assignee: JB Innovations Limited, New Plymouth (NZ)

( * ) Notice: Subject to any disclaimer, the term of this patent is extended or adjusted under 35 U.S.C. 154(b) by 774 days.

(21) Appl. No.: 17/294,219

(22) PCT Filed: Nov. 15, 2019

(86) PCT No.: PCT/NZ2019/050151
§ 371 (c)(1),
(2) Date: May 14, 2021

(87) PCT Pub. No.: WO2020/101508
PCT Pub. Date: May 22, 2020

(65) Prior Publication Data
US 2022/0017164 A1    Jan. 20, 2022

(30) Foreign Application Priority Data
Nov. 16, 2018 (NZ) ........................................ 748475

(51) Int. Cl.
*B62D 55/28* (2006.01)
(52) U.S. Cl.
CPC .................................... *B62D 55/28* (2013.01)
(58) Field of Classification Search
CPC ....... B62D 55/26; B62D 55/28; B62D 55/283
See application file for complete search history.

(56) References Cited

U.S. PATENT DOCUMENTS

| RE3,602 E | 8/1869 | Johnson |
|---|---|---|
| 1,395,134 A | 10/1921 | Messner |

(Continued)

FOREIGN PATENT DOCUMENTS

| CA | 2137859 A1 | 6/1996 |
|---|---|---|
| CA | 2690367 A1 | 7/2011 |

(Continued)

OTHER PUBLICATIONS

International Search Report dated Jan. 17, 2020, issued in PCT Application No. PCT/NZ2019/050151, filed Nov. 15, 2019.

(Continued)

*Primary Examiner* — Jason R Bellinger
(74) *Attorney, Agent, or Firm* — Workman Nydegger

(57) ABSTRACT

There is disclosed a device for use with a continuous track of a tracked vehicle. The device has a first component and a second component. Each component has an elongate body having first and second slots at one end, a third slot at the other end, ground engaging features, and a U-shaped bracket. The device has a first configuration in which a first fastener extends through the first slot of the first component and the third slot of the second component and a second fastener extends through the first slot of the second component and the third slot of the first component. The device has a second configuration in which the first fastener extends through the second slot of the first component and the third slot of the second component and the second fastener extends through the second slot of the second component and the third slot of the first component.

20 Claims, 7 Drawing Sheets

(56) References Cited

U.S. PATENT DOCUMENTS

| | | |
|---|---|---|
| 1,594,502 A | 8/1926 | Elzey |
| 1,832,926 A | 11/1931 | Edstedt |
| 2,129,557 A | 9/1938 | Beach |
| 3,717,387 A | 2/1973 | Cackley et al. |
| 3,883,190 A | 5/1975 | Kilbane, Jr. |
| 4,109,971 A | 8/1978 | Black et al. |
| 4,123,119 A | 10/1978 | Stedman |
| 4,165,137 A | 8/1979 | Stedman |
| 5,388,900 A | 2/1995 | Suzuki |
| 5,713,645 A | 2/1998 | Thompson et al. |
| 5,769,511 A | 6/1998 | Hattori |
| 6,299,265 B1 | 10/2001 | Hoffart |
| 6,478,389 B2 | 11/2002 | Doyle |
| 6,540,310 B1 | 4/2003 | Cartwright |
| 6,557,954 B1 | 5/2003 | Hattori |
| 6,637,840 B2 | 10/2003 | Zaleski et al. |
| 7,901,015 B1 | 3/2011 | Anderson |
| 9,260,145 B2 | 2/2016 | Korus et al. |
| 11,173,972 B2 * | 11/2021 | Hall ................. B62D 55/26 |
| 11,390,341 B2 * | 7/2022 | Burling ............. B62D 55/28 |
| 2003/0184157 A1 | 10/2003 | McNutt et al. |
| 2004/0140717 A1 | 7/2004 | McNutt et al. |
| 2004/0174068 A1 | 9/2004 | McNutt et al. |
| 2013/0049452 A1 | 2/2013 | Burling |
| 2014/0175865 A1 | 6/2014 | Korus et al. |
| 2015/0175225 A1 | 6/2015 | Hall |
| 2017/0259632 A1 | 9/2017 | Abad |
| 2018/0127037 A1 | 5/2018 | Lafreniere et al. |

FOREIGN PATENT DOCUMENTS

| | | |
|---|---|---|
| DE | 202012100868 U1 | 5/2012 |
| DE | 202013011423 U1 | 3/2014 |
| EP | 0 579 211 B1 | 4/1998 |
| FR | 2114564 A5 | 11/1971 |
| JP | 2004-058688 A | 2/2004 |
| WO | 2000/18638 A1 | 4/2000 |
| WO | 2004/052684 A1 | 6/2004 |
| WO | 2009/033052 A1 | 3/2009 |

OTHER PUBLICATIONS

Written Opinion dated Jan. 17, 2020, issued in PCT Application No. PCT/NZ2019/050151, filed Nov. 15, 2019.

International Preliminary Report on Patentability dated Oct. 12, 2020, issued in PCT Application No. PCT/NZ2019/050151, filed Nov. 15, 2019.

* cited by examiner

DEVICE TO ENHANCE THE TRACTION OF A TRACKED VEHICLE

FIELD OF THE INVENTION

This invention relates to a device for use with a continuous track of a tracked vehicle to enhance the traction of the vehicle.

BACKGROUND

Continuous tracks are often used on off-road vehicles to provide ground contact and traction for large vehicles. Standard continuous tracks are formed from a number of rigid shoes that are joined to each other by hinges. Another type of standard track is a continuous rubber track. Each track typically has one or more ground engaging features to provide traction. Standard continuous tracks provide traction in general situations. However, those standard tracks do not provide adequate traction on steep slopes, or slopes that are slippery from mud, water or ice. In particular, those standard tracks do not provide adequate traction on steep or slippery slopes for larger, heavier vehicles.

Typically, to increase the traction of a tracked vehicle, additional traction devices are welded to the track. However, those traction devices can only be removed by being cut free, which can damage the track and/or the device. Welding the traction devices to the track and cutting the devices free from the track can be difficult and time consuming.

There are a number of devices for use with the continuous track of a tracked vehicle. Examples of such devices are described in U.S. Re 36,02 that describes a detachable elastic pad to protect a road surface from damage caused by a tracked vehicle; JP 2001233375 that describes a padded track for a track belt; and NZ 511373 that describes an elastic pad for a crawler track. The pads described in those documents are designed to reduce damage to the ground and would not provide good stability to a vehicle on a steep or slippery slope. U.S. Pat. No. 6,540,310 describes a grouser structure that provides traction and shock absorption and JP 2004058688 describes a detachable grouser for a track. Both those documents describe using fasteners that extend through the track, which can be awkward to assemble if the track is already installed on a vehicle.

US 2004/0174068, US 2003/0184157, and US 2004/0140717 each describes a detachable grouser assembly for use with vehicles having continuous tracks. Those documents describe attaching the grousers with fasteners that extend through the track or with chains that extend over the track. As described above, attaching a grouser assembly with fasteners can be awkward if the track is already installed on a vehicle. Attaching a grouser assembly using a chain is not very secure and the assembly could be ripped off when the vehicle is used. U.S. Pat. No. 6,299,265 describes a replaceable tyre gripping system for an endless track to extend the life of a track. The system described in this document would not enhance the traction of a tracked vehicle.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a device to enhance the traction of a vehicle having a continuous track, and/or to at least provide the public with a useful choice.

SUMMARY OF THE INVENTION

In accordance with a first aspect of the invention, there is provided a device for use with a continuous track of a tracked vehicle to enhance the traction of the vehicle, the track having a tread with recesses, the device comprising:
  a first component and a second component, each of the first component and the second component having:
  an elongate body having a first slot and a second slot at or near one end of the elongate body and a third slot at or near the other end of the elongate body, each of the slots configured to receive a fastener;
  a plurality of ground engaging features extending upwardly from the elongate body;
  a U-shaped bracket having an outwardly extending portion with a track engaging surface for engaging a top surface of the track, a downwardly extending portion, and an inwardly extending portion with a track engaging surface for engaging a lower surface of the track, a portion of the outwardly extending portion proximal the downwardly extending portion is wider than a portion of the outwardly extending portion distal the downwardly extending portion; and
  a first fastener and a second fastener;
  wherein the device has a first configuration in which the first fastener extends through the first slot of the first component and the third slot of the second component and the second fastener extends through the first slot of the second component and the third slot of the first component, the fasteners securing the first and second components together, and a second configuration in which the first fastener extends through the second slot of the first component and the third slot of the second component and the second fastener extends through the second slot of the second component and the third slot of the first component, the fasteners securing the first and second components together.

The term 'comprising' as used in this specification means 'consisting at least in part of'; that is to say when interpreting statements in this specification which include 'comprising', the features prefaced by this term in each statement all need to be present but other features can also be present. Related terms such as 'comprise' and 'comprised' are to be interpreted in a similar manner.

In one embodiment, the U-shaped bracket is at or near the end of the elongate body.

In one embodiment, the first slot and the second slot are at the same end of the elongate body as the U-shaped bracket.

In one embodiment, the first slot and/or the second slot are located above the U-shaped bracket.

In one embodiment, the elongate body extends at a non-parallel angle to a centre line of the U-shaped bracket.

In one embodiment, a substantial portion of the elongate body of the first component is configured to overlap with a substantial portion of the elongate body of the second component when the first component and second component are assembled together.

In one embodiment, the elongate body of the first component extends to a location above the bracket of the second component when the first component and second component are assembled together.

In one embodiment, the U-shaped bracket is integrally formed with the elongate body.

In one embodiment, the ground engaging features are integrally formed with the elongate body.

In one embodiment, when the first and second components are fastened together, the fastener generally extends in a running direction of the track.

In one embodiment, the track engaging surface of the inwardly extending portion faces the track engaging surface of the outwardly extending portion and extends in a direction substantially parallel to the direction of the track engaging surface of the outwardly extending portion.

In one embodiment, the device further comprises additional ground contacting features to further enhance the traction of the device.

In one embodiment, the elongate body is substantially rigid.

In one embodiment, the device is releasably secured to the continuous track.

In one embodiment, the plurality of ground engaging features each have a generally chevron or inverted V-shaped portion of a ground engaging surface, when viewed from above the elongate body.

In one embodiment, the device further comprises one or more spacers or packers.

In accordance with a second aspect of the invention, there is provided a device for use with a continuous track of a tracked vehicle to enhance the traction of the vehicle, the track having a tread with recesses, the device comprising:
  a first component and a second component, each of the first component and the second component having:
  an elongate body having a first slot and a second slot at or near one end of the elongate body and a third slot at or near the other end of the elongate body, each of the slots configured to receive a fastener;
  a plurality of ground engaging features extending upwardly from the elongate body;
  a U-shaped bracket having an outwardly extending portion with a track engaging surface for engaging a top surface of the track, a downwardly extending portion, and an inwardly extending portion with a track engaging surface for engaging a lower surface of the track, a portion of the outwardly extending portion proximal the downwardly extending portion is wider than a portion of the outwardly extending portion distal the downwardly extending portion; and
  a fastening mechanism configured to connect the first component and second component together.

In one embodiment, the U-shaped bracket is at or near the end of the elongate body.

In one embodiment, the elongate body extends at a non-parallel angle to a centre line of the U-shaped bracket.

In one embodiment, the substantial portion of the elongate body of the first component is configured to overlap with a substantial portion of the elongate body of the second component when the first component and second component are assembled together.

In one embodiment, the elongate body of the first component extends to a location above the bracket of the second component when the first component and second component are assembled together.

In one embodiment, the U-shaped bracket is integrally formed with the elongate body.

In one embodiment, the ground engaging features are integrally formed with the elongate body.

In one embodiment, wherein, when the first and second components are fastened together, the fastener generally extends in a running direction of the track.

In one embodiment, the track engaging surface of the inwardly extending portion faces the track engaging surface of the outwardly extending portion and extends in a direction substantially parallel to the direction of the track engaging surface of the outwardly extending portion.

In one embodiment, the device further comprises additional ground contacting features to further enhance the traction of the device.

In one embodiment, the elongate body is substantially rigid.

In one embodiment, the device is releasably secured to the continuous track.

In one embodiment, the plurality of ground engaging features each have a generally chevron or inverted V-shaped portion of a ground engaging surface, when viewed from above the elongate body.

In one embodiment, the device further comprises one or more spacers or packers.

In accordance with a third aspect of the invention, there is provided a combination of a track and at least one device of any the first aspect or the second aspect secured to the track.

In one embodiment, the device is releasably secured to the continuous track.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF EMBODIMENTS OF THE INVENTION

Figure 1:
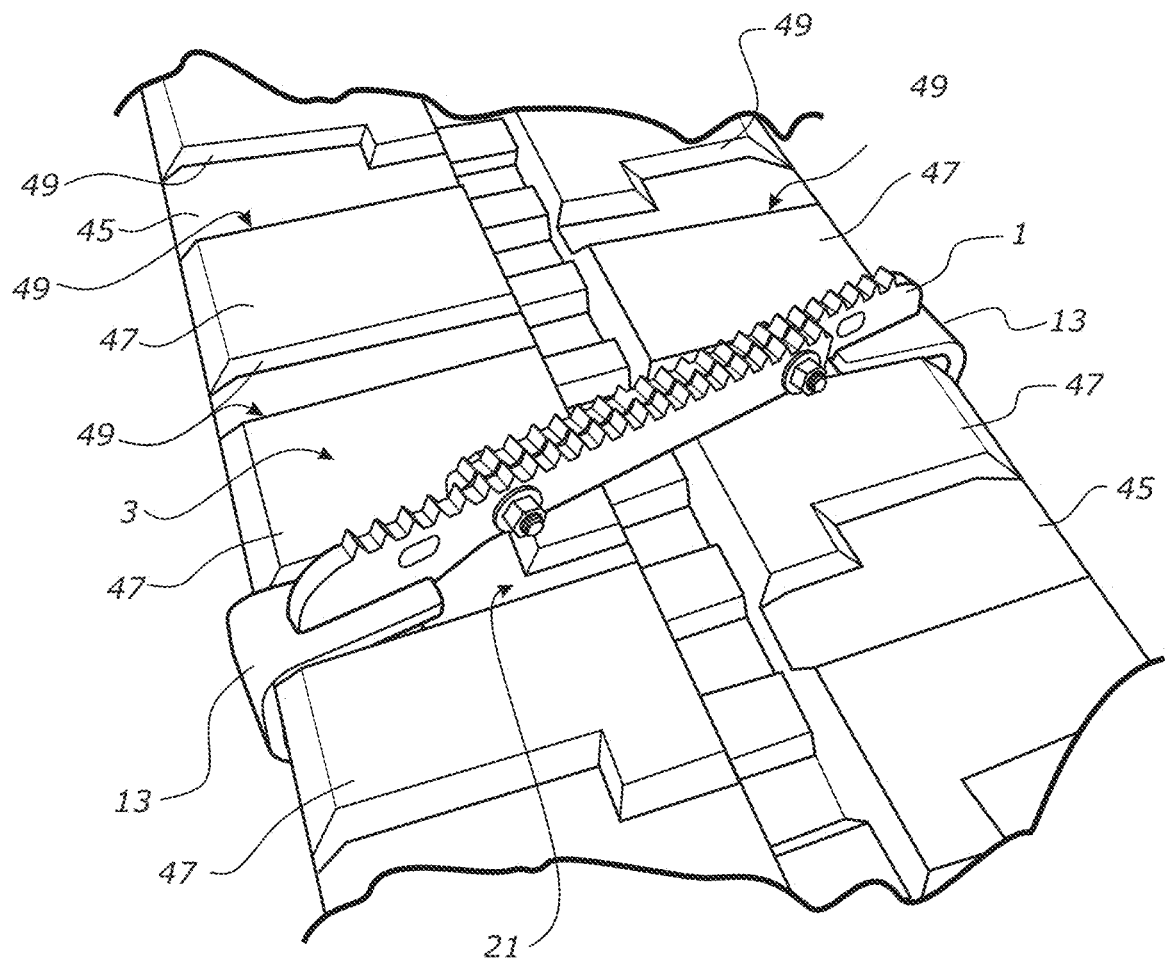
FIG. 1 is a perspective view of an embodiment of the device in use with a continuous track of a tracked vehicle.
Figure 2:
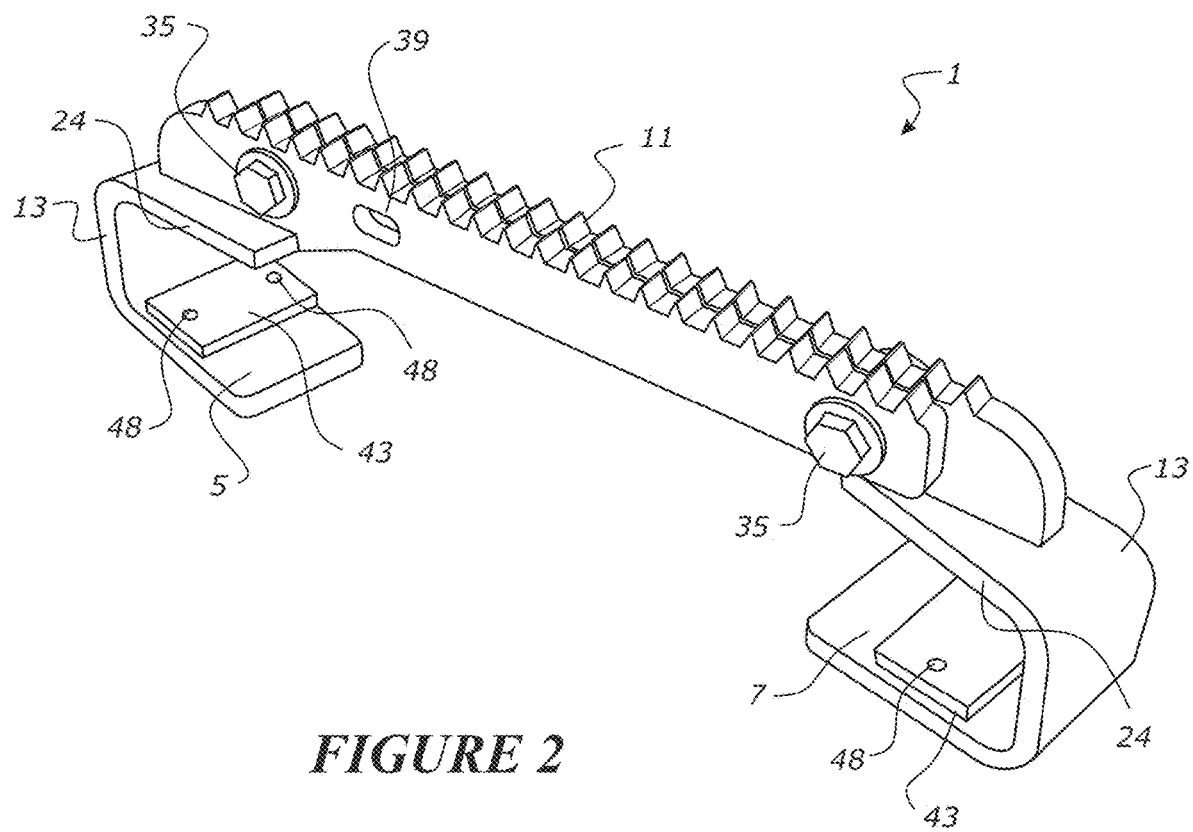
FIG. 2 is a perspective view of an embodiment of the device in a first configuration.

With reference to FIGS. 1 to 10, an embodiment of the device 1 for use with a continuous track 3 of a tracked vehicle is shown. The device may be used on any tracked vehicle to enhance traction, such as a digger, bulldozer, snowmobile, crawler, or tank, for example. In particular, the device is useful for tracked vehicles having rubber tracks. FIG. 1 shows the device 1 in use with a continuous track 3 of the tracked vehicle. The device is releasably secured to the continuous track.

Unless otherwise specified, it should be appreciated that references to directions in the following description such as top, upper, and lower are for reference only, and should not be considered limiting. Further, those directions refer to a device when it is in the position shown in FIG. 1, that is, on the top part of the track.

The device 1 comprises a first component 5 and a second component 7. Each of the first component 5 and the second component 7 are identical and each component has the same features. The following description will describe the first component 5, but it will be appreciated that the second component 7 has the same features.

The first component 5 has an elongate body 9, a plurality of ground engaging features 11 extending upwardly from the elongate body 9, a U-shaped bracket 13, and fastening mechanism 15 configured to connect the first component 5 and second component 7 together. The elongate body 9, plurality of ground engaging features 11, and the bracket 13 are substantially rigid features. The U-shaped bracket 13 is at or near the end of the elongate body 9.

Figure 9:
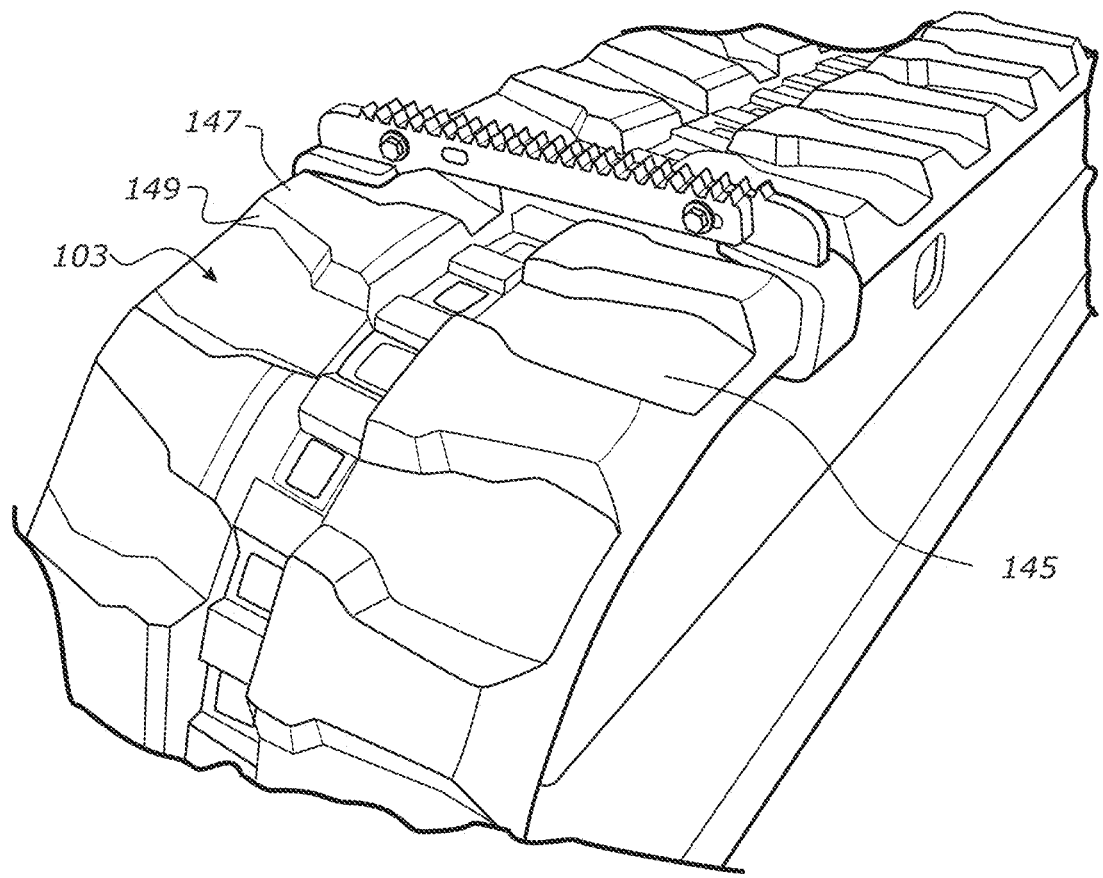
FIG. 9 shows an embodiment of the device in use with a continuous track of a tracked vehicle having a different tread to the tread shown in FIG. 1.
Figure 10:
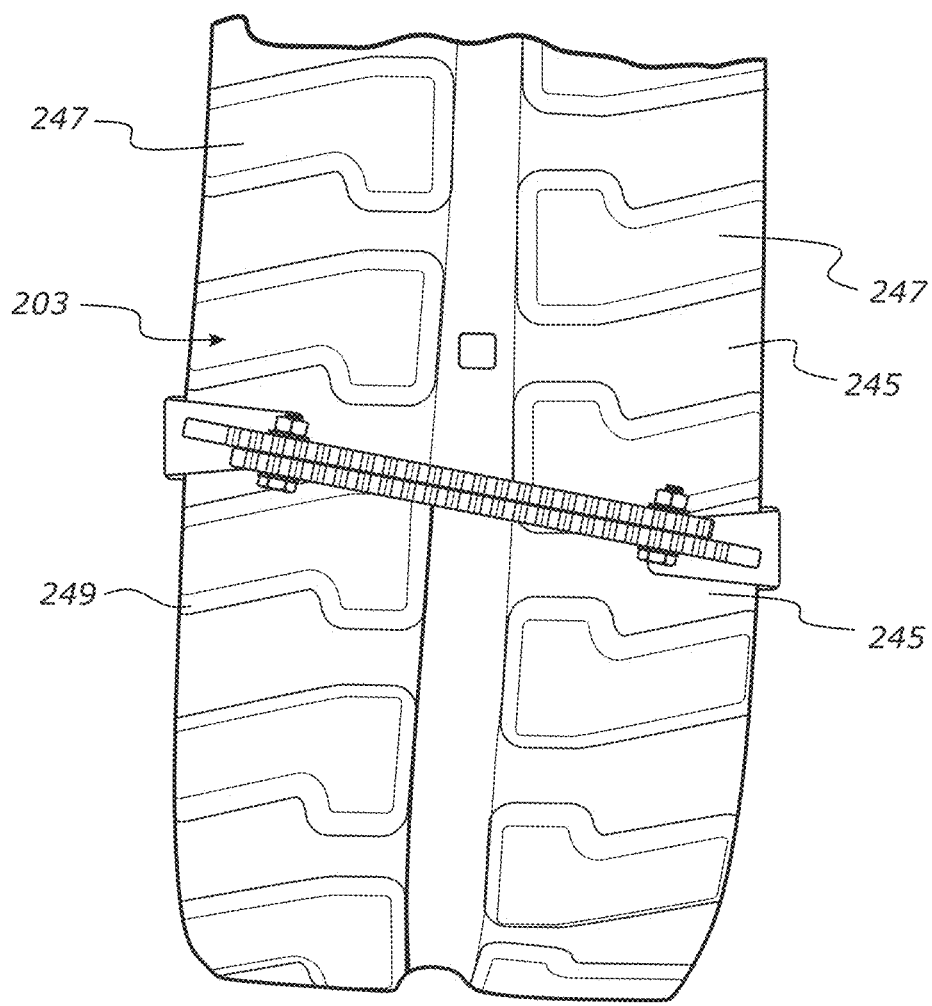
FIG. 10 shows an embodiment of the device in use with a continuous track of a tracked vehicle having another different tread to the tread shown in FIG. 1.

The device 1 is a multi-fit device that may be used for different tracked vehicles. That is, the same device 1 can be used for different tracked vehicles. There are a variety of different tracked vehicles, with a range of different widths and tread profiles. The device 1 described herein can be used on a wide range of different tracks. It is not necessary to have a different version of the device for different sized tracks and/or different treads. FIG. 9 shows an embodiment of the device 1 in use with a continuous track 103 of a tracked vehicle having a different tread to the tread shown in FIG. 1. FIG. 10 shows an embodiment of the device 1 in use with a continuous track 203 of a tracked vehicle having another different tread to the tread shown in FIG. 1.

The multi-fit features of the device 1 include having a first configuration configured for use with a relatively narrow track (for example a 400 mm wide track) and a second configuration configured for use with a relatively wide track (for example a 450 mm wide track). Another multi-fit feature is the bracket 13 having one or more tapered surfaces for engaging with the tread of the track. A further multi-fit feature is the bracket 13 having one or more spacers 43 or packers. Details of the various multi-fit features are described in more detail below.

Figure 4:
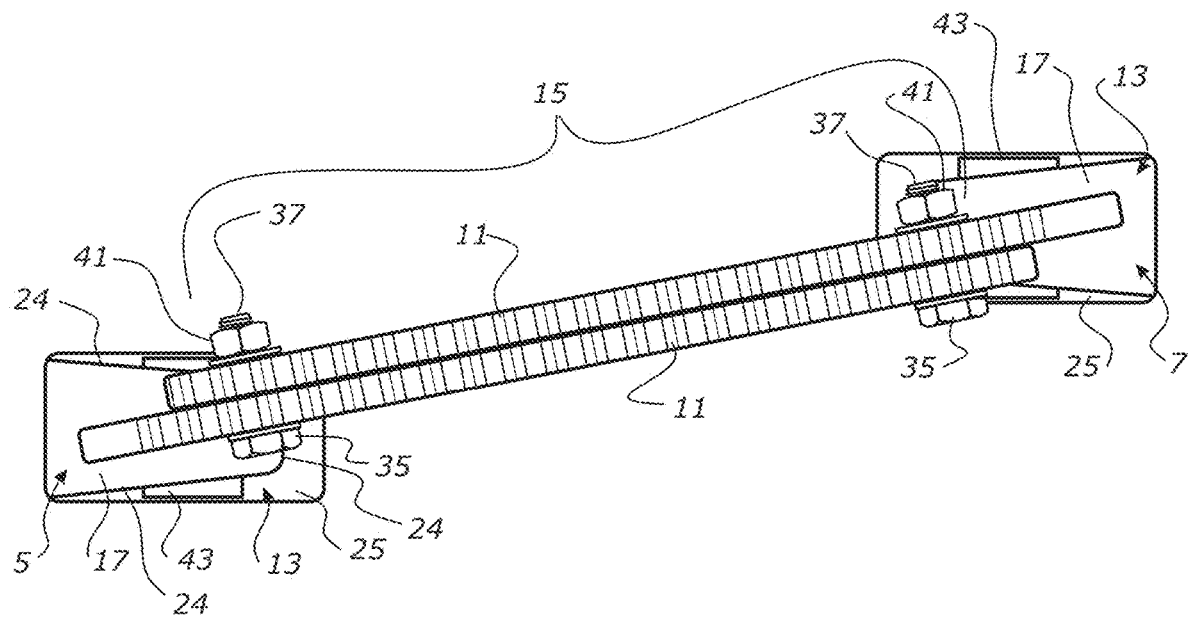
FIG. 4 is a top view of the device of FIG. 2.
Figure 5:
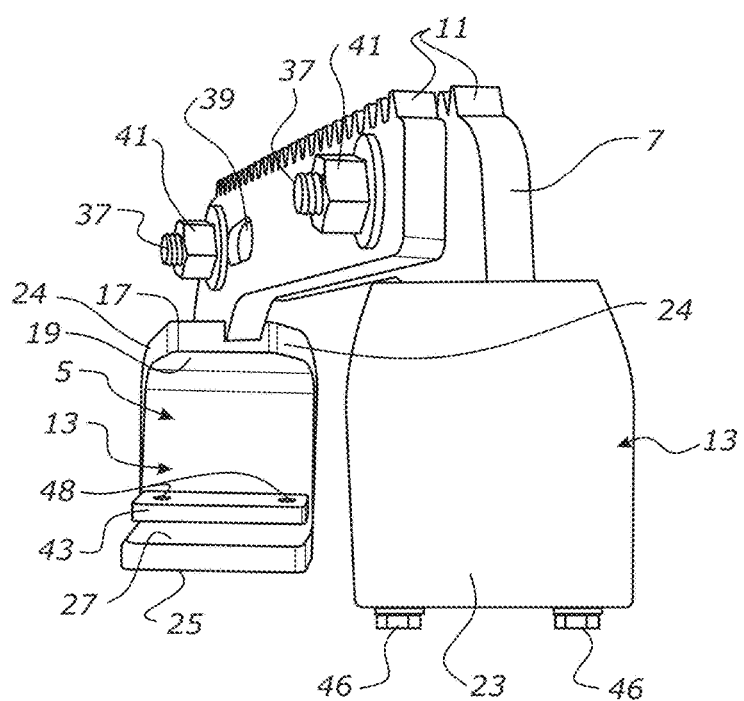
FIG. 5 is an end view of the device of FIG. 2.
Figure 7:
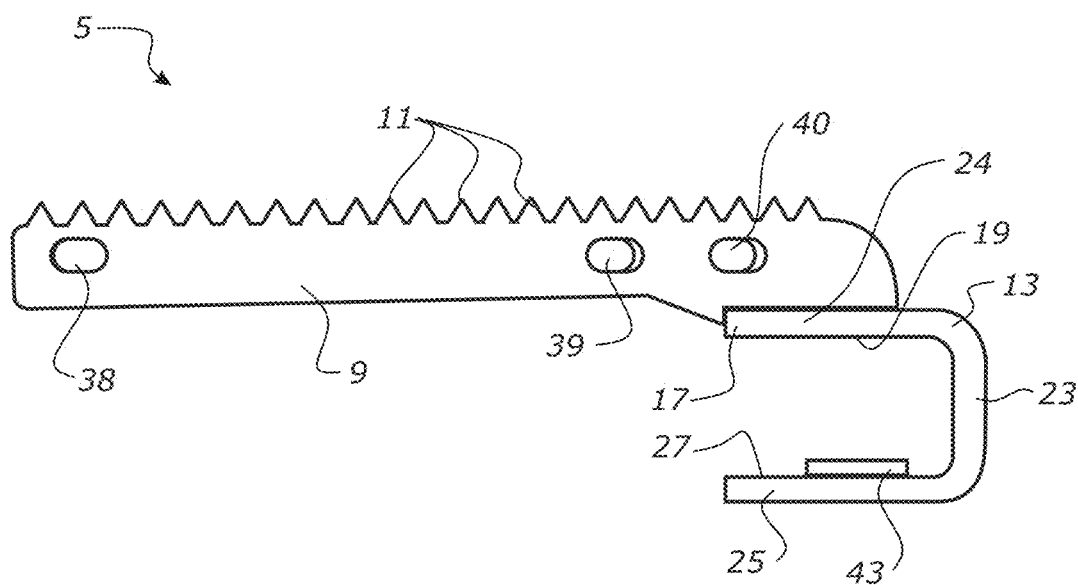
FIG. 7 is a front view of the component of FIG. 6.
Figure 8:
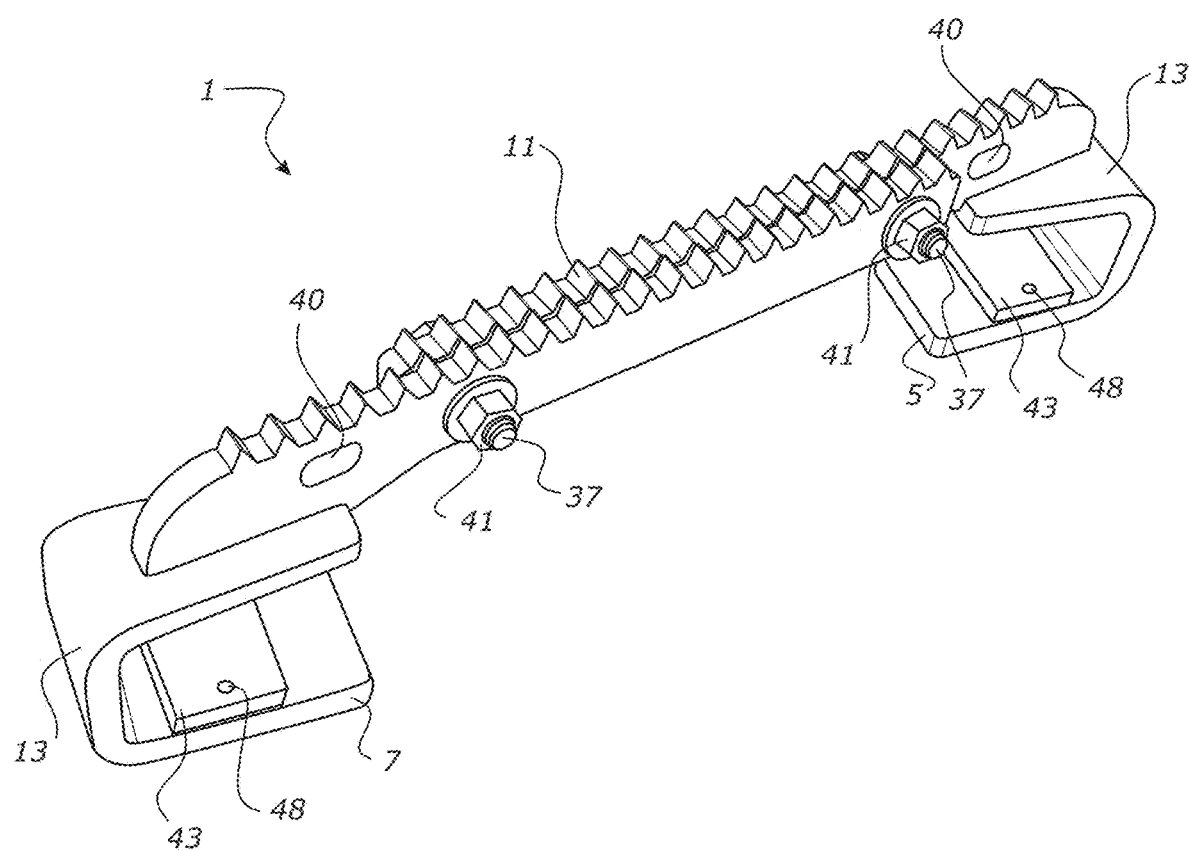
FIG. 8 is a perspective view of the device of FIG. 2 in a second configuration.

With reference to FIGS. 4 and 7, the elongate body 9 has a generally rectangular cross-sectional profile with the bracket 13 at one end. The bracket 13 has an outwardly extending portion 17 with a track engaging surface 19 for engaging a top surface 21 of the track, a downwardly extending portion 23, and an inwardly extending portion 25 with a track engaging surface 27 for engaging a lower surface (not visible) of the track. With reference to FIG. 4, the track engaging surface 27 of the inwardly extending portion 25 faces the track engaging surface 19 of the outwardly extending portion 17. Those surfaces 19, 27 extend in a direction substantially parallel to each other. In alternative embodiment, those surfaces 19, 27 may extend at an angle relative to each other.

Figure 6:
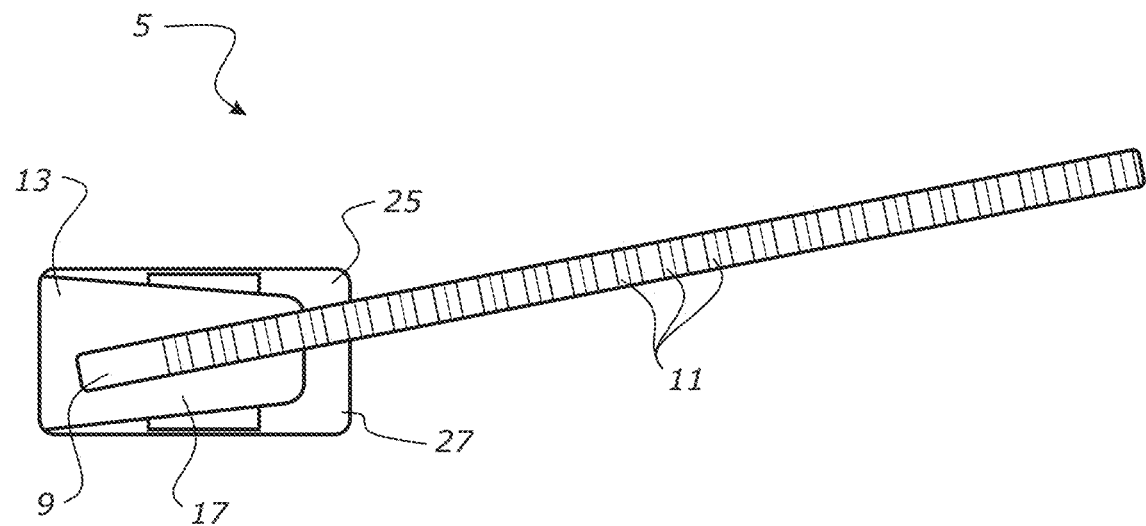
FIG. 6 is a top view of a first component of the device of FIG. 2.

As shown in FIGS. 4 and 6, the elongate body 9 extends at a non-parallel angle to a centre line of the U-shaped bracket 13. In the embodiment shown, the angle is about 12°. In alternative embodiments, the angle may be about 5°, about 10°, about 15°, about 20°, about 25°, about 30°, about 35°, about 40°, about 45°, about 50°, about 55°, about 60°, about 65°, about 70°, about 75°, about 80°, or about 85°.

A portion of the outwardly extending portion 17 proximal the downwardly extending portion 23 is wider than a portion of the outwardly extending portion 17 distal the downwardly extending portion 23. This creates a tapered engagement surface 24 on the sides of the brackets 13. The tapered engagement surfaces 24 are configured to engage a surface of the track, such as a tread of the track. For example, the tapered engagement surfaces 24 are configured to engage the walls 49, 149, or 249 of recess 45, 145, 245 of the tread of the track 3 such that engagement surfaces 24 of the first and second component abut side walls 49, 149, 249 of the recesses 45, 145, 245.

The taper is a constant taper. In alternative embodiments, the taper may be non-constant. For example, the tapered surface 24 may be a curved and/or stepped surface. The tapered engagement surface 24 is one of the features that allows the device 1 to be used on a variety of different tracks. In particular, the tapered engagement surface 24 is compatible with a track having angled tread features, such as the tread shown in FIGS. 9 and 10. The tapered engagement surface 24 is also compatible with a track having non-angled tread features (perpendicular to the edge of the track 3), such as the tread shown in FIG. 1. It will be understood that a tread having an angle that is similar to the angle of the tapered engagement surface 24 will have greater engagement than a tread having a different angle. However, the device is also compatible with a tread having a different angle to the angle of the tapered surface.

In the embodiment shown, the inwardly extending portion 25 is the same width at each end. The inwardly extending portion 25 has a constant width. In an alternative embodiment, the inwardly extending portion 25 may also have a taper. The taper angle may be the same as the taper angle of the outwardly extending portion, or may be a different taper angle.

The device may also include one or more spacers 43 or packers. The spacers 43 may be about 2 mm thick, about 4 mm thick, about 6 mm thick, about 8 mm thick, or about 10 mm thick, for example. The device may be provided with a variety of spacers 43. The spacers 43 are preferably attached to the brackets 13 using fasteners, such as bolts 46. The bolts 46 engage with apertures 48 in the spacers 43. The spacers 43 are one of the features that allows the device 1 to be used on a variety of different tracks. In particular, the spacers 43 allow the device 1 to be used with tracks having different thicknesses. If the track 3 is relatively thin, a larger spacer 43 can be used.

Figure 3:
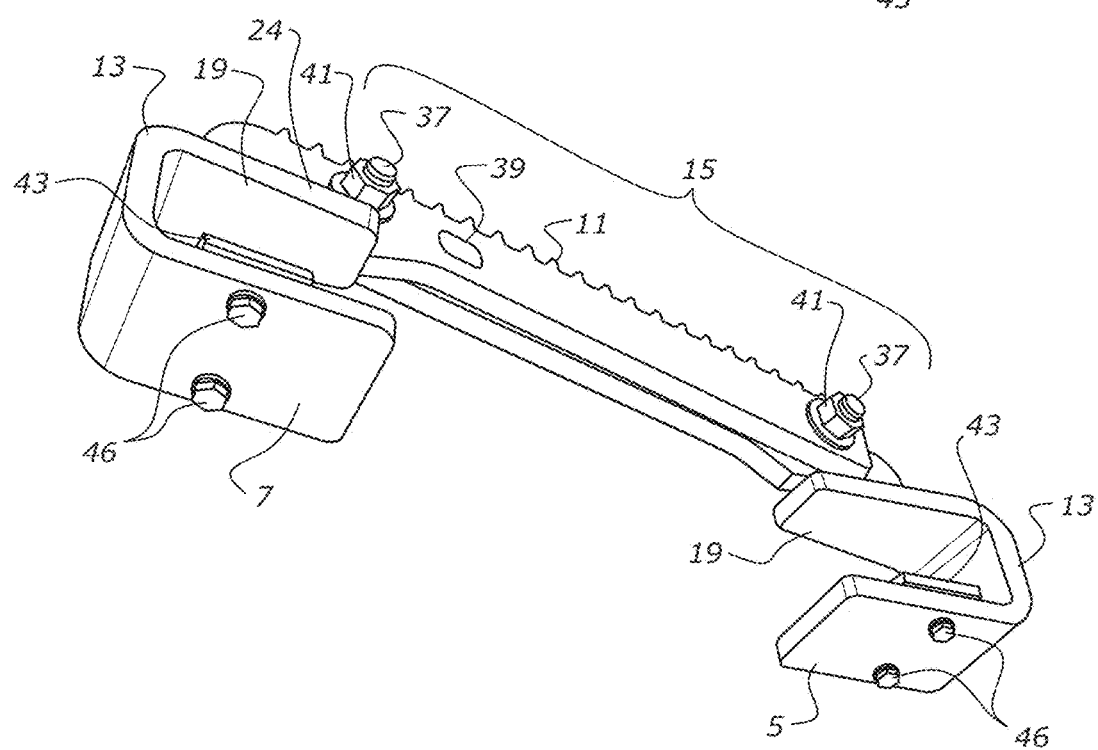
FIG. 3 is a perspective view from below of the device of FIG. 2.

With reference to FIGS. 3 and 7, the fastening mechanism 15 has a first fastener and a second fastener. In the embodiment shown, the fasteners are bolts 35 that are secured with nuts 41. The nut 41 is preferably a lock nut or stop nut, such as a nyloc nut. Each bolt has a shaft 37 configured to extend through the slots 38, 39, 40 in the elongate body 9. The first component 5 and second component 7 are connected by the fasteners 35 at the centre of the device 1 with portions of the elongate bodies 9 overlapping. A substantial portion of the elongate body 9 of the first component 5 is configured to overlap with a substantial portion of the elongate body 9 of the second component 7 when the first component 5 and second component 7 are assembled together. The overlap is present in both the first configuration and the second configuration.

The elongate body 9 has a first slot 40 and a second slot 39 at or near one end of the elongate body 9 and a third slot 38 at or near the other end of the elongate body 9. Each of the slots 38, 39, 40 is configured to receive a fastener 35. The slots 38, 39, 40 have a length of about 20 mm to about 30 mm, allowing the relative position of the first and second components to be adjusted to suit the width of the track 3, in addition to the first and second configurations that allow the device to be used with narrow or wide tracks.

The elongate body 9 of the first component 5 extends to a location above the bracket 13 of the second component 7 when the first component 5 and the second component 7 are assembled together. The first slot 40 and the second slot 39 are at the same end of the elongate body as the U-shaped bracket. In the embodiment shown, the first slot 40 and the second slot 39 are located above the U-shaped bracket 13. The second component 7 has corresponding features. When the first component 5 and the second component 7 are assembled together, there is a substantial overlap between the elongate bodies 9.

The device 1 has a first configuration (FIG. 2) in which the first fastener 35 extends through the first slot 40 of the first component and the third slot 38 of the second component, and the second fastener 35 extends through the first slot 40 of the second component and the third slot 38 of the first component 5. The fasteners 35 secure the first and second components together. The device 1 has a second configuration (FIG. 8) in which the first fastener 35 extends through the second slot 39 of the first component and the third slot 38 of the second 7 component and the second fastener 35 extends through the second slot 39 of the second component and the third slot 38 of the first component, the fasteners 35 securing the first and second components together. The first configuration is a relatively narrow configuration in which the brackets 13 are closer to each other than the second configuration.

When the first and second components are fastened together, the fastener 35 extends generally in a running direction of the track 3. In both the first configuration and the second configuration, there is a substantial overlap between the elongate bodies 9. That is, the majority of the elongate body 9 of the first component 5 overlaps with the majority of the elongate body 9 of the second component 7.

In the embodiment shown, the U-shaped bracket 13 is integrally formed with the elongate body 9. In particular, the elongate body 9 and bracket 13 are welded together. Alternatively, the elongate body 9 and bracket 13 may be cast as a single component.

In the embodiment shown, the ground engaging features 11 are integrally formed with the elongate body 9. The device may have additional ground engaging or contacting features to further enhance the traction of the device.

The plurality of ground engaging features 11 each have a generally chevron or inverted V-shaped portion of a ground engaging surface, when viewed from above the elongate body. In the embodiment shown, each of the ground engaging features are in the form of teeth 11. Each tooth 11 is generally triangular. Each of the spaces 31 between the teeth is also generally triangular. The teeth form a saw tooth-like part. The teeth may be evenly or unevenly spaced along the length of the elongate body 9.

Further, the ground engaging features, or other parts of the device, may be formed with further tread or rough surface to further improve the traction of the tracked vehicle with the device. The device may further have spikes (not shown) attached to the elongate body 9. Those spikes can also be useful for icy or snowy conditions, for example.

The elongate body 9, brackets 13 and teeth 11 may be formed from a suitable metallic material, such as mild steel. The brackets may be formed from steel plate and bent into the required shape. Alternatively, the brackets may be cast into the required shape. In an alternative embodiment, the bracket may be formed as a separate component and fixed to the elongate body 9 by fasteners, for example.

With reference to FIG. 1, the device is shown secured to the track 3. The bracket 13 of the first component 5 is arranged to secure one end of the elongate body 9 to one side of the continuous track 3 and the bracket 13 of the second component 7 is arranged to secure the other end of the elongate body 9 to other side of the continuous track 3. That is, the device extends across the transverse length of the track 3, from one side of the track to the other side of the track.

The elongate body 9 is adapted to be positioned in a recess 45 of the track 3, that is, between protrusions 47 of the continuous track 3. The elongate body 9 may be positioned between two protrusions 47 and extend over an intermediate protrusion. The top surface of each of the brackets 13 may be the same height as the top surface of track, higher than the top surface of track, or lower than the top surface of track.

FIG. 9 shows an embodiment of the device 1 in use with a continuous track 103 of a tracked vehicle having a different tread to the tread shown in FIG. 1. The track 103 has recesses 145, with walls 149, and protrusions 147 similar to the track 3 of FIG. 1, except the tread pattern is different. FIG. 10 shows an embodiment of the device 1 in use with a continuous track 203 of a tracked vehicle having another different tread to the tread shown in FIG. 1. The track 203 has recesses 245, with walls 249, and protrusions 247 similar to the track 3 of FIG. 1, except the tread pattern is different.

The recesses 45 of the track 3 of FIG. 1 are substantially L-shaped when viewed from above.

The recesses 145 of the track 103 of FIG. 9 are wider close to the edge of the track 103 and narrower further away from edge of the track, when viewed from above. The recesses 145 have a step. In addition, the walls are tapered such that a portion of the recess near the edge of the track is wider than a portion of the recess closer to the centre of the track 103.

The recesses 245 of the track of FIG. 10 are a mirrored L-shape (backwards L) when viewed from above, except the side walls extend at a non-perpendicular angle to the side of the track 203, when viewed from above. That is, the recesses 245 are a mirrored L-shape, but angled. The overall shape of the device 1 is complementary to, or compatible with, the shape of all the recesses 45, 145, 245, without necessarily matching the shape of the recesses 45, 145, 245.

The device 1 nests within the recesses 45, 145, 245 of the tread of the track 3, 103, 203 such that engagement surfaces of the first and second component abut side walls 49, 149, 249 of the recesses 45, 145, 245. In the embodiment shown, the engagement surfaces are the sides 24 of the outwardly extending portion of the bracket 13. Depending on the tread of the track 3, 103, 203, only a part of the engagement surfaces may abut the side walls 49, 149, 249 of the recesses 45, 145, 245, or the entire engagement surface may side abut or contact the walls 49, 149, 249 of the recesses 45, 145, 245.

A method of placing the device 1 on a track 3 will now be described with reference to FIG. 1. A similar method would be used for the track 103, 203 shown in FIGS. 9 and 10. The first component 5 is placed on the track 3. The bracket 13 of the first component is pushed onto the track 3 by hand. Spacers 43 may be placed on the brackets 13. The bracket 13 (with or without spacers) preferably fits tightly onto the track 3, without substantially compressing the rubber track. The bracket 13 can be hammered to reduce the gap between the track engaging surfaces of the bracket, if the gap is too big. The second component 7 is placed on the track 3 in a similar manner. The fasteners 35 are inserted into the slots. Depending on the width of the track 3, the fasteners 35 will be inserted into the first slots 40 and the third slots 38 or the second slots 39 and the third slots 38. The slots 38, 39, 40 formed in the elongate body 9 allow the components to move relative to the each other across the width of the track 3. Over time, tracks can become worn and the width of the track can decrease. The fasteners 35 are then tightened manually using a spanner. When the fasteners 35 are tightened, the first component 5 and second component 7 are drawn together in the running direction of the track 3. The secured device 1 is shown in FIG. 1. The device 1 is releasably secured to the continuous track.

In use, more than one device 1 would be used on the continuous track 3. For example, a continuous track 3 may have about five or six devices 1 along the track 3, spaced about one metre apart. The number of devices 1 used on a track 3 can be chosen depending on the traction required for any situation.

The device 1 may also be useful in situations where the vehicle is stuck, such as in very muddy situations. One end of a chain can be attached to the device 1 and the other end can be secured. The vehicle can then be driven forward by the vehicle pulling on the chain.

The device 1 can be removed by loosening the fasteners 35, which will release the first component 5 and the second component 7 from each other. The device 1 can then be removed from the track 3.

Embodiments of the invention have been described by way of example only and modifications may be made thereto without departing from the scope of the invention.

For example, the device 1 may be formed with a textured surface and/or other outwardly extending features to further enhance the traction of the device and the continuous track.

For example, the ground engaging features 11 have been described as teeth having triangular or chevron shaped components. Alternatively, the teeth may have any other suitable shape, such as rectangular or square, for example.

The upper surface of the bracket 13 may have projections for contacting the ground surface. For example, the top surface of the bracket 13 may have serrations or teeth for contacting the ground surface.

The invention claimed is:

1. A device for use with a continuous track of a tracked vehicle to enhance the traction of the vehicle, the track having a tread with recesses, the device comprising:
    a first component and a second component, each of the first component and the second component having:
        an elongate body having a first slot and a second slot at a first end of the elongate body or nearer the first end of the elongate body than a second end of the elongate body, and a third slot at the second end of the elongate body or nearer the second end of the elongate body than the first end of the elongate body, each of the slots configured to receive a fastener;
        a plurality of ground engaging features extending upwardly from the elongate body;
        a U-shaped bracket having an outwardly extending portion with a track engaging surface for engaging a top surface of the track, a downwardly extending portion, and an inwardly extending portion with a track engaging surface for engaging a lower surface of the track, a portion of the outwardly extending portion proximal the downwardly extending portion is wider than a portion of the outwardly extending portion distal the downwardly extending portion; and
    a first fastener and a second fastener;
    wherein the device has a first configuration in which the first fastener extends through the first slot of the first component and the third slot of the second component and the second fastener extends through the first slot of the second component and the third slot of the first component, the fasteners securing the first and second components together, and a second configuration in which the first fastener extends through the second slot of the first component and the third slot of the second component and the second fastener extends through the second slot of the second component and the third slot of the first component, the fasteners securing the first and second components together.

2. The device according to claim 1, wherein the U-shaped bracket is at the first end of the elongate body or nearer the first end of the elongate body than the second end of the elongate body.

3. The device according to claim 1, wherein the first slot and the second slot are at the same end of the elongate body as the U-shaped bracket.

4. The device according to claim 1, wherein first slot and/or the second slot are located above the U-shaped bracket.

5. The device according to claim 1, wherein the elongate body extends at a non-parallel angle to a centre line of the U-shaped bracket.

6. The device according to claim 1, wherein a substantial portion of the elongate body of the first component is configured to overlap with a substantial portion of the elongate body of the second component when the first component and second component are assembled together.

7. The device according to claim 1, wherein the elongate body of the first component extends to a location above the bracket of the second component when the first component and second component are assembled together.

8. The device according to claim 1, wherein the U-shaped bracket is integral with the elongate body.

9. The device according to claim 1, wherein the ground engaging features are integrally formed with the elongate body.

10. The device according to claim 1, wherein the track engaging surface of the inwardly extending portion faces the track engaging surface of the outwardly extending portion and extends in a direction substantially parallel to the direction of the track engaging surface of the outwardly extending portion.

11. A device for use with a continuous track of a tracked vehicle to enhance the traction of the vehicle, the track having a tread with recesses, the device comprising:
    a first component and a second component, each of the first component and the second component having:

an elongate body having a first slot and a second slot at a first end of the elongate body or nearer the first end of the elongate body than a second end of the elongate body, and a third slot at the second end of the elongate body or nearer the second end of the elongate body than the first end of the elongate body, each of the slots configured to receive a fastener;

a plurality of ground engaging features extending upwardly from the elongate body;

a U-shaped bracket having an outwardly extending portion with a track engaging surface for engaging a top surface of the track, a downwardly extending portion, and an inwardly extending portion with a track engaging surface for engaging a lower surface of the track, a portion of the outwardly extending portion proximal the downwardly extending portion is wider than a portion of the outwardly extending portion distal the downwardly extending portion; and a fastening mechanism configured to connect the first component and second component together.

12. The device according to claim 11, wherein the U-shaped bracket is at the first end of the elongate body or nearer the first end of the elongate body than the second end of the elongate body.

13. The device according to claim 11, wherein the elongate body extends at a non-parallel angle to a centre line of the U-shaped bracket.

14. The device according to claim 11, wherein the substantial portion of the elongate body of the first component is configured to overlap with a substantial portion of the elongate body of the second component when the first component and second component are assembled together.

15. The device according to claim 11, wherein the elongate body of the first component extends to a location above the bracket of the second component when the first component and second component are assembled together.

16. The device according to claim 11, wherein the U-shaped bracket is integral with the elongate body.

17. The device according to claim 11, wherein the ground engaging features are integrally formed with the elongate body.

18. The device according to claim 11, wherein the track engaging surface of the inwardly extending portion faces the track engaging surface of the outwardly extending portion and extends in a direction substantially parallel to the direction of the track engaging surface of the outwardly extending portion.

19. A combination comprising:
a track; and
at least one device as recited in claim 18 secured to the track.

20. The combination of claim 19, wherein the at least one device is releasably secured to the track.

* * * * *